United States Patent Office 3,445,496
Patented May 20, 1969

3,445,496
ORGANOSILICON XANTHIC ESTERS
John W. Ryan, Midland, Mich., assignor to Dow Corning Corporation, Midland, Mich., a corporation of Michigan
No Drawing. Filed Jan. 14, 1966, Ser. No. 520,667
Int. Cl. C07f 7/18; C08g 31/26, 31/32
U.S. Cl. 260—448.8                    7 Claims

ABSTRACT OF THE DISCLOSURE

Organosilicon xanthic esters which are useful as sizing agents and chemical intermediates. Examples of such compounds are

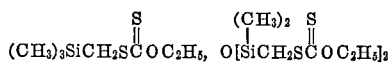

and

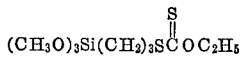

This application relates to novel organosilicon compounds that are useful as sizing agents, elastomeric materials, and chemical intermediates.

The compounds of this invention include both silanes and siloxanes. The silanes of this invention are of the formula $$R_{4-n}Si(R'S\overset{S}{\overset{\|}{C}}OR'')_n$$

where R is selected from the group consisting of monovalent hydrocarbon and halohydrocarbon radicals, hydrolyzable groups, hydrogen, and the hydroxyl group, R' is a divalent hydrocarbon radical, R" is a lower alkyl radical, and $n$ has a value of 1 to 3.

R can be any monovalent hydrocarbon radical; e.g. alkyl radicals such as methyl, ethyl, isopropyl, n-hexyl, 2-ethylhexyl, and octadecyl; unsaturated radicals such as vinyl, ethynyl, allyl, butadienyl, or 5-hexenyl; cycloaliphatic radicals such as cyclohexyl or cyclopentenyl; and aromatic containing radicals such as phenyl, tolyl, benzyl, xenyl, or naphthyl. R can also be any monovalent halohydrocarbon radical; e.g. haloalkyl such as chloromethyl, 3,3,3-trifluoropropyl, β-(perfluoroheptyl)ethyl, or 4-bromohexyl; unsaturated radicals such as 3-chloroallyl; cyclohaloaliphatic radicals such as chlorocyclohexyl or iodocyclopentenyl; and aromatic-containing radicals such as fluorophenyl, dibromophenyl, bromoxenyl, α,α,α-trifluorotolyl, or chlorobenzyl, or any hydrolyzable group known to the art; e.g. lower alkoxy groups such as methoxy, ethoxy, isopropoxy, butoxy, or isohexoxy; acyloxy groups such as acetate, propionate or butyrate; ketoxime groups such as

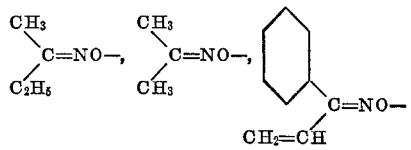

or

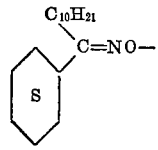

halogen groups such as F, Cl, Br, or I; the amino group; the isocyanate group; or

where R" is defined above.

R' can be any divalent hydrocarbon radical such as methylene, dimethylene,

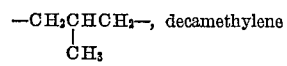

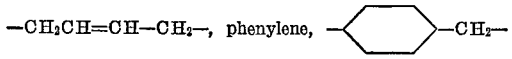

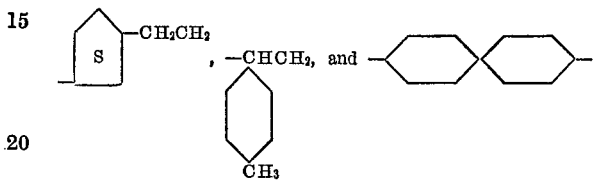

R" can be any lower alkyl radical such as methyl, ethyl, isopropyl, sec-butyl, or amyl.

The organopolysiloxanes of this invention contain at least one unit of the formula

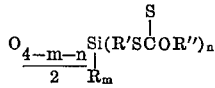

where R is selected from the group consisting of monovalent hydrocarbon and halohydrocarbon radicals, hydrolyzable groups, hydrogen, and the hydroxyl group, R' is a divalent hydrocarbon radical, R" is a lower alkyl radical, $n$ has a value of 1 to 3, and $m$ has a value of 0 to 2, the sum of $m$ and $n$ being from 1 to 3, any other siloxane units present being of the formula $$A_xSiO_{\frac{4-x}{2}}$$

where A is selected from the group consisting of monovalent hydrocarbon and halohydrocarbon radicals, hydrolyzable groups, hydrogen, and the hydroxyl group, and $x$ has a value of 0 to 3.

Examples of various radicals which can be represented by A are shown above, as are examples of R, R', and R".

The silanes and siloxanes of this invention can be prepared by reacting a silane of the formula $R_{4-n}Si(R'Cl)_n$, or an organopolysiloxane containing at least one unit of the formula

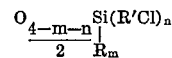

with a compound of the formula

where M is an alkali metal atom, and the other symbols are defined above. This latter compound, which is well known, can be made by reacting carbon disulfide with a mixture of MOH and R"OH, M is preferably potassium, and R" is preferably ethyl.

The organopolysiloxanes of this invention can also be made by the known processes of hydrolysis or cohydrolysis of the appropriate silanes.

The silanes of this invention are suitable as sizing agents, as adhesion promoters for plastics to glass, and as surfactants. The siloxanes of this invention are useful fluids and thermoplastic, elastomeric, and resinous materials.

The following examples are illustrative only and should not be construed as limiting the invention, which is properly delineated in the appended claims.

EXAMPLE 1

Potassium ethyl xanthate

was prepared by the reaction of equimolar parts of ethanol, potassium hydroxide, and carbon disulfide at a temperature of about 30° C.

A mixture of 30 g. of potassium ethyl xanthate, 24.6 g. of trimethylchloromethylsilane, and 50 ml. of acetonitrile was warmed to 65° C. An exothermic reaction commenced, and the temperature rose to 83° C.

The reaction mixture was then washed with a mixture of 100 ml. of water and 100 ml. of pentane.

Distillation of the pentane fraction resulted in the isolation of 32 g. of

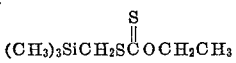

$n_D^{25}$ 1.5165, boiling point —105° C., (10 mm.), $d^{25°\text{ C.}}$ —1.006.

EXAMPLE 2

A mixture of 11.6 g. of

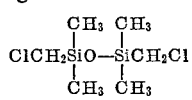

15 g. of potassium ethyl xanthate, and 200 cc. of acetonitrile were heated for 4 hours at 82° C.

The product was washed with water, dried, filtered, and devolatilized to yield

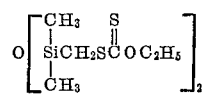

$n_D^{25}$ 1.5317, $d^{25°\text{ C.}}$ —1.094.

EXAMPLE 3

A mixture of 50 g. of (CH$_3$O)$_3$SiCH$_2$CH$_2$CH$_2$Cl, 50 g. of potassium ethyl xanthate, and 100 cc. of acetonitrile was heated at 50° C. for 13 hours.

The resulting product was devolatilized under a vacuum and filtered to obtain a 40 percent yield of

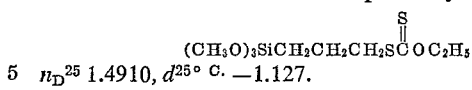

$n_D^{25}$ 1.4910, $d^{25°\text{ C.}}$ —1.127.

EXAMPLE 4

A mixture of 42 g. of

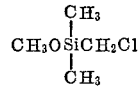

53 g. of potassium ethyl xanthate, and 150 cc. of acetonitrile was warmed to 40° C. An exothermic reaction resulted, with the reaction temperature rising to 75° C. The mixture was then refluxed for one hour.

The product was filtered and distilled under a vacuum to obtain an 81% yield of

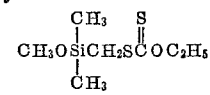

$n_D^{25}$ 1.5110 $d^{25°\text{ C.}}$ —1.065, B.P. 80° C. (1 mm.)

EXAMPLE 5

A mixture of 72 g. of

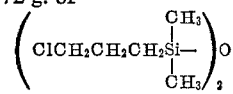

80 g. of potassium ethyl xanthate, and 200 cc. of acetonitrile were heated for about 16 hours at 55° C.

The product was devolatilized and washed with water and Skelly F solvent. The solvent fraction was dried, filtered, and stripped to yield 104 g. of

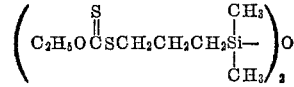

$n_D^{25}$ 1.5154, $d^{25°\text{ C.}}$ 1.058.

EXAMPLE 6

When the following silane reactants are reacted at 75° C. with a 10% solution of sodium methyl xanthate in acetonitrile, the following products are formed.

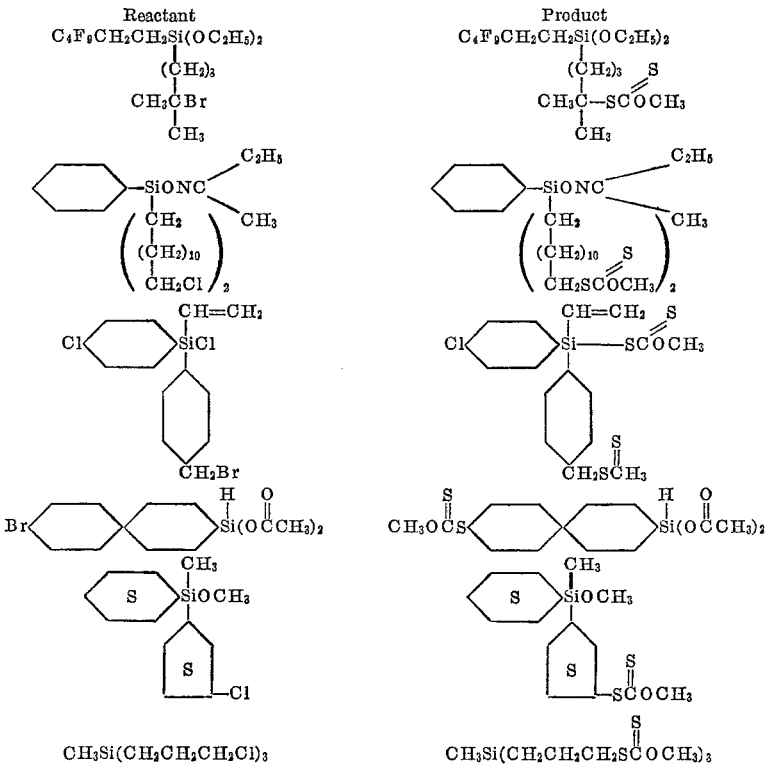

EXAMPLE 7

When 5 g. of

Br⟨C₆H₄⟩−Si(CH₃)₂−[OSi(CH₃)(CH₂CH₂CF₃)]₁₀−OSi(CH₃)₂−⟨C₆H₄⟩Br are refluxed with a 10 percent propionitrile solution of potassium isopropyl xanthate, the product $$(CH_3)_2CHO\overset{S}{\overset{\|}{C}}S\text{-}⟨C_6H_4⟩\text{-}Si(CH_3)_2\text{-}[OSi(CH_3)(CH_2CH_2CF_3)]_{10}\text{-}Si(CH_3)_2\text{-}⟨C_6H_4⟩\text{-}S\overset{S}{\overset{\|}{C}}OCH(CH_3)_2$$

is formed.

EXAMPLE 8

When 10 g. of $$C_2H_5O\overset{S}{\overset{\|}{C}}SCH_2CH_2CH_2Si(OCH_3)_2$$
$$|$$
$$CH_3$$

is hydrolyzed in the presence of excess water containing a trace of acetic acid, $$C_2H_5O\overset{S}{\overset{\|}{C}}SCH_2CH_2CH_2Si(OH)_2$$
$$|$$
$$CH_3$$

is formed. Upon gentle heating, this silane condenses to form a homopolymer containing $$\left(C_2H_5O\overset{S}{\overset{\|}{C}}SCH_2CH_2CH_2\underset{|}{\underset{CH_3}{Si}}O\right)$$

units.

EXAMPLE 9

When 10 g. of

⟨C₆H₄⟩−⟨C₆H₄⟩−Si(OCH₃)₂
                |
              (CH₂)₄
                |
              S−C−OC₄H₉
                ‖
                S is cohydrolyzed with 3 g. of phenyldichlorosilane, 0.1 g. of Si(OC₂H₅)₄, and 0.5 g. of allyldimethylchlorosilane, the product is a polysiloxane containing $$\left(⟨C_6H_4⟩\text{-}⟨C_6H_4⟩\text{-}\underset{(CH_2)_4SCOC_4H_9}{\underset{\underset{S}{\|}}{Si}}O\right), \left(⟨C_6H_4⟩SiO_{3/2}\right)$$

$$\left(⟨C_6H_4⟩\underset{|}{\overset{H}{Si}}O\right), (CH_2=CHCH_2\underset{|}{\overset{CH_3}{Si}}O_{1/2})$$
$$CH_3 \quad\quad\quad\quad\quad\quad CH_3$$

and (SiO₄/₂) units.

EXAMPLE 10

When 5 g. of $$Cl(CH_2)_3\underset{|}{\overset{CH_3}{Si}}O\text{-}\left(\underset{|}{\overset{CH_3}{\underset{CH_3}{Si}}}O\right)_{50}\text{-}\underset{|}{\overset{CH_3}{Si}}(CH_2)_3Cl$$
$$CH_3 \quad\quad\quad\quad\quad\quad CH_3$$

are refluxed with a 30 g. of acetonitrile and 2 g. of potassium ethyl xanthate, the product $$C_2H_5O\overset{S}{\overset{\|}{C}}S(CH_2)_3\underset{|}{\overset{CH_3}{Si}}O\text{-}\left(\underset{|}{\overset{CH_3}{\underset{CH_3}{Si}}}O\right)_{50}\text{-}\underset{|}{\overset{CH_3}{Si}}(CH_2)_3S\overset{S}{\overset{\|}{C}}OC_2H_5$$
$$CH_3 \quad\quad\quad\quad\quad\quad CH_3$$

is formed.

That which is claimed is:

1. A silane of the formula $$R_{4-n}Si(R'S\overset{S}{\overset{\|}{C}}OR'')_n$$

where
R contains no more than 18 carbon atoms and is selected from the group consisting of monovalent hydrocarbon and halohydrocarbon radicals, hydrolyzable groups, hydrogen, and the hydroxyl group,
R' is a divalent hydrocarbon radical containing no more than 12 carbon atoms,
R'' is a lower alkyl radical, and
n has a value of 1 to 3.

2. The silane of claim 1 where n has a value of 1.
3. The silane of claim 1 where R' is alkylene.
4. An organopolysiloxane containing at least one unit of the formula $$O_{\frac{4-m-n}{2}}Si(R'S\overset{S}{\overset{\|}{C}}OR'')_n$$
$$\quad\quad\quad R_m$$

R contains no more than 18 carbon atoms and is selected from the group consisting of monovalent hydrocarbon and halohydrocarbon radicals, hydrolyzable groups, hydrogen, and the hydroxyl group,
R' is a divalent hydrocarbon radical containing no more than 12 carbon atoms,
R'' is a lower alkyl radical,
n has a value of 1 to 3, and
m has a value of 0 to 2,
   the sum of m and n being from 1 to 3, any other siloxane units present being of the formula $$A_xSiO_{\frac{4-x}{2}}$$

where
A is selected from the group consisting of monovalent hydrocarbon and halohydrocarbon radicals, hydrolyzable groups, hydrogen, and the hydroxyl group, and
x has a value of 0 to 3.

5. A silane of claim 1 of the formula $$(CH_3O)_3SiCH_2CH_2CH_2S\overset{S}{\overset{\|}{C}}OC_2H_5$$

6. A silane of claim 1 of the formula $$CH_3O\underset{|}{\overset{CH_3}{Si}}CH_2S\overset{S}{\overset{\|}{C}}OC_2H_5$$
$$CH_3$$

7. A silane of claim 1 of the formula $$C_2H_5O\overset{S}{\overset{\|}{C}}SCH_2CH_2CH_2Si(OCH_3)_2$$
$$|$$
$$CH_3$$

References Cited

UNITED STATES PATENTS 2,802,853  8/1957  George.
3,284,466  11/1966  Rosenthal _____ 260—448.2 XR TOBIAS E. LEVOW, Primary Examiner.

P. F. SHAVER, Assistant Examiner.

U.S. Cl. X.R.

260—46.5, 448.2